Feb. 9, 1971 A. L. SOLOW 3,561,136
QUESTION AND ANSWER GAME
Filed June 25, 1968 2 Sheets-Sheet 2

INVENTOR.
ANDREW LLOYD SOLOW
BY
*Joseph Weingarten*
*Stanley M. Scharjin*
ATTORNEYS

United States Patent Office 3,561,136
Patented Feb. 9, 1971

3,561,136
QUESTION AND ANSWER GAME
Andrew Lloyd Solow, 5743 Rhodes Ave.,
North Hollywood, Calif. 91607
Filed June 25, 1968, Ser. No. 739,787
Int. Cl. G09b 7/00
U.S. Cl. 35—9
8 Claims

ABSTRACT OF THE DISCLOSURE

A question and answer game in which the techniques of reinforced learning are employed to provide an educational and yet amusing game. Questions and multiple choice answers are arranged on a coded card which is connected to an electronic circuit having a pair of hand held probes connected thereto. The probes are used to match a question and an answer for the multiple choice group, the selection of a correct answer being operative to energize an appropriate indicator, while the selection of any erroneous answer is operative to shock the player by means of a shocking potential applied to the handles of the probes and/or a derogatory noise heard in conjunction with the shock.

FIELD OF THE INVENTION

This invention relates to amusement and educational games and more particularly to question and answer games.

BACKGROUND OF THE INVENTION

Games which are attractive from an educational point of view often lack the element of amusement or fun necessary to maintain the popularity of the game. The studies of Pavlov and the later work of Skinner have indicated the advantage in the learning process of reinforcing positive and negative responses of a student by suitable rewards or punishments, as the case may be. In accordance with the principles of this invention, the techniques of reinforced learning are employed in a game which offers both amusement and educational encouragement.

SUMMARY OF THE INVENTION

Briefly, the present invention comprises a multiple choice question and answer game in which the selection of a correct answer by the player is indicated by the energization of a suitable indicator, while the selection of a wrong answer causes the player to receive an electrical shock which may also be in conjunction with a "razzberry" buzzing noise. Question and multiple choice answers are arranged on a coded card, each question and answer being associated with a pair of interconnected conductive points located on the face of the card. The conductive points or spots associated with the answers are connected to an electronic circuit while the correct answers are connected to hidden conductive paths to the conductive points associated with the questions. A pair of hand held probes are connected to the circuit, the probes having conductive tips adapted to contact respective conductive points of a question and answer, and conductive handles by which the probes are held. The electronic circuit includes a low voltage subcircuit adapted to energize an indicator when a correct answer is selected and a high voltage subcircuit adapted to apply a shocking potential to the probe handles when an incorrect answer is selected.

To play the game, the tip of one probe is placed in contact with the conductive point of a question while the tip of the other probe is placed in contact with a conductive point of an answer which has been selected. If a correct answer has been selected, the first and second conductive points will be interconnected by a hidden conductive path which completes a circuit to energize an indicator denoting the correct response. If, on the other hand, any incorrect answer has been selected, a voltage is impressed by means of the tips of the probes onto a voltage divider network which is operative to energize a high voltage circuit to apply a shocking potential to the probe handles, and also, if desired, to initiate a buzzing or other suitable noise. The player is, therefore, rewarded when a correct answer is selected while being, in effect, punished by the shock and/or the noise when an incorrect answer is chosen.

DESCRIPTION OF THE DRAWINGS

The invention will be more fully understood from the following detailed description, taken in conjunction with the accompanying drawings, in which.

DETAILED DESCRIPTION OF THE INVENTION

Figure 1:
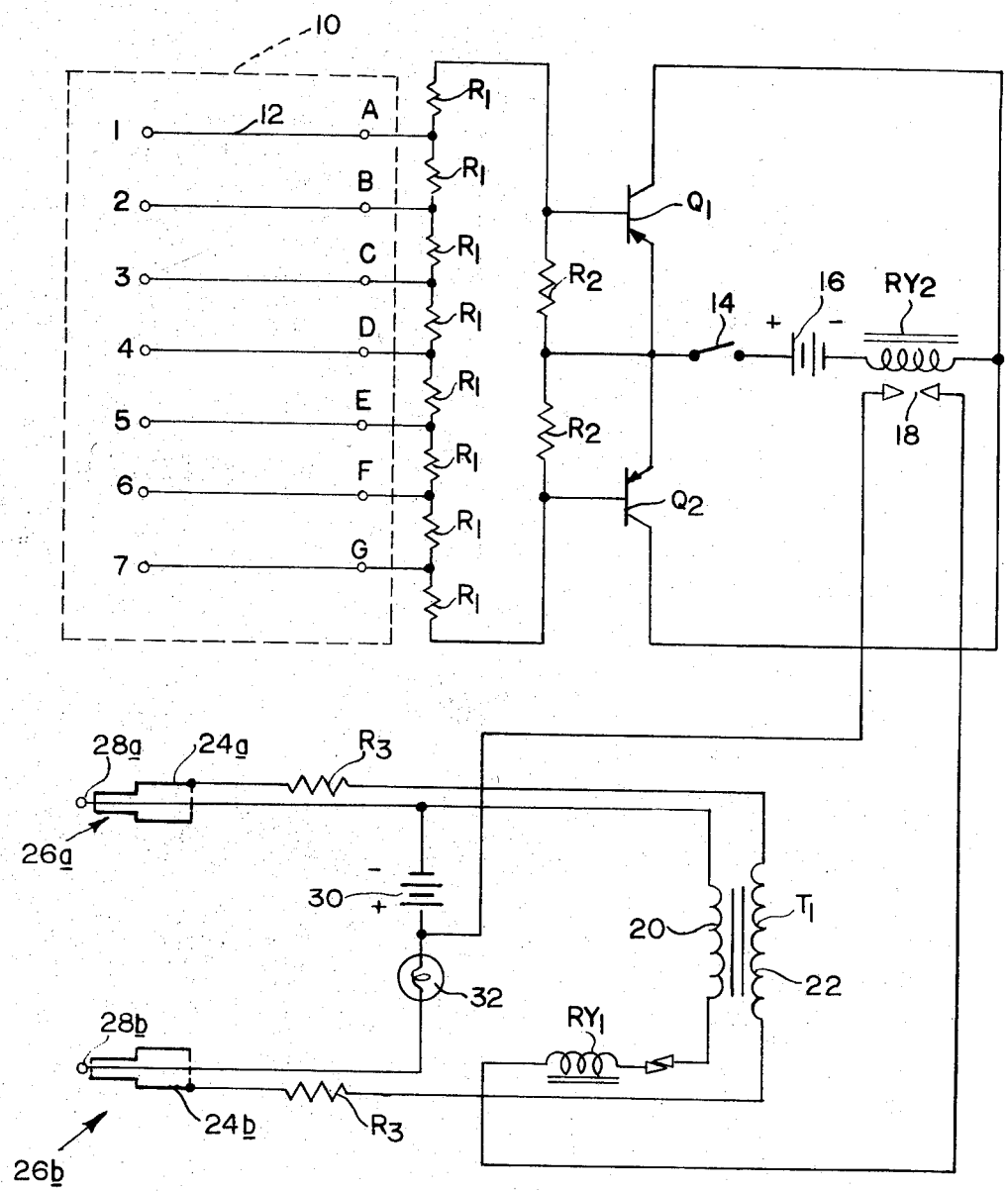
FIG. 1 is a schematic diagram of the question and answer game according to the present invention.

Referring to FIG. 1, there is shown the circuitry embodying the present question and answer game. A coded circuit card 10 has a plurality of conductive points labelled 1 through 7 connected selectively to a second plurality of test points labelled A through G. As will be explained hereinafter, the numbered conductive points are associated with questions while the lettered conductive points are associated with multiple choice answers and conductive paths 12 can be provided to interconnect selected numbered and lettered points. The lettered conductive points are connected to a voltage divider network comprising eight resistors R1 of equal value, the series string of resistors being connected to the respective base electrodes of transistors Q1 and Q2. The emitters of transistors Q1 and Q2 are connected together and are also connected by way of respective resistors R2 to the collector of corresponding transistors. The emitters are connected through a switch 14 to the positive terminal of a DC supply 16, the negative terminal of which is connected through the coil of a relay RY2 to the collectors of both transistors. The contacts 18 of relay RY2 are connected to a vibrating relay RY1 and the primary coil 20 of a step-up transformer T1. The secondary 22 of transformer T1 is connected through respective current limiting resistors R3 to the conductive handles 24A and 24B of respective probes 26A and 26B. The respective tips 28A and 28B of the respective probes are connected to DC source 30 and indicator lamp 32 in the manner illustrated.

Typical component values for the above-described circuit are as follows:

Handles—metal sleeve telephone plugs
Transistors Q1 and Q2—2N265
Resistors R1 and R2—100 ohms
Resistors R3—50K ohms
Relay RY1—1.5 volts DC, 1 ohm
Relay RY2—2 milliamperes DC, 2500 ohms
Transformer T1—20:1
Voltage source 30—1.5 volts
Voltage source 16—9 volts Study of the schematic of FIG. 1 will reveal that the circuit includes a low voltage circuit including the conductive path 12 interconnecting a question and a correct answer point, probe tips 28A, 28B, voltage source 30 and indicator lamp 32, and also includes a high voltage circuit including the relays, transformer T1, and probe handles 24A and 24B, together with the voltage divider and transistor switches. In operation, tips 28A and 28B are applied to a respective question point and answer point and if a correct answer has been chosen a conductive path 12 will interconnect the question and answer points completing the low voltage circuit and causing indicator lamp 32 to light, thereby indicating a correct response.

If, however, an incorrect answer is selected, the potential from source 30 is impressed upon one or more of the resistors R1 of the voltage divider causing one of the transistors Q1 and Q2 to conduct depending upon the polarity of the applied voltage. The polarity of the voltage will of course depend upon the placement of the probes on respective question and answer points. With on-off switch 14 closed, the conducting transistor will allow a current to flow through the coil of relay RY2 causing relay contact 18 to close and thereby completing the circuit between voltage source 30, primary winding 20, and vibrating relay RY1. The contacts of relay RY1 vibrate making a buzzing noise and causing a pulsating direct current voltage to appear across primary winding 20 and a corresponding higher shock voltage to appear across secondary winding 22. This higher voltage is applied to the handles 24A and 24B of the probes, resistors R3 being employed to limit the shock current to a comfortable magnitude. Thus, an incorrect response to a question causes the player to be shocked, clearly indicating his incorrect response and also providing a considerable measure of amusement and excitement due to the electrical shock and the buzzing noise.

Figure 2:
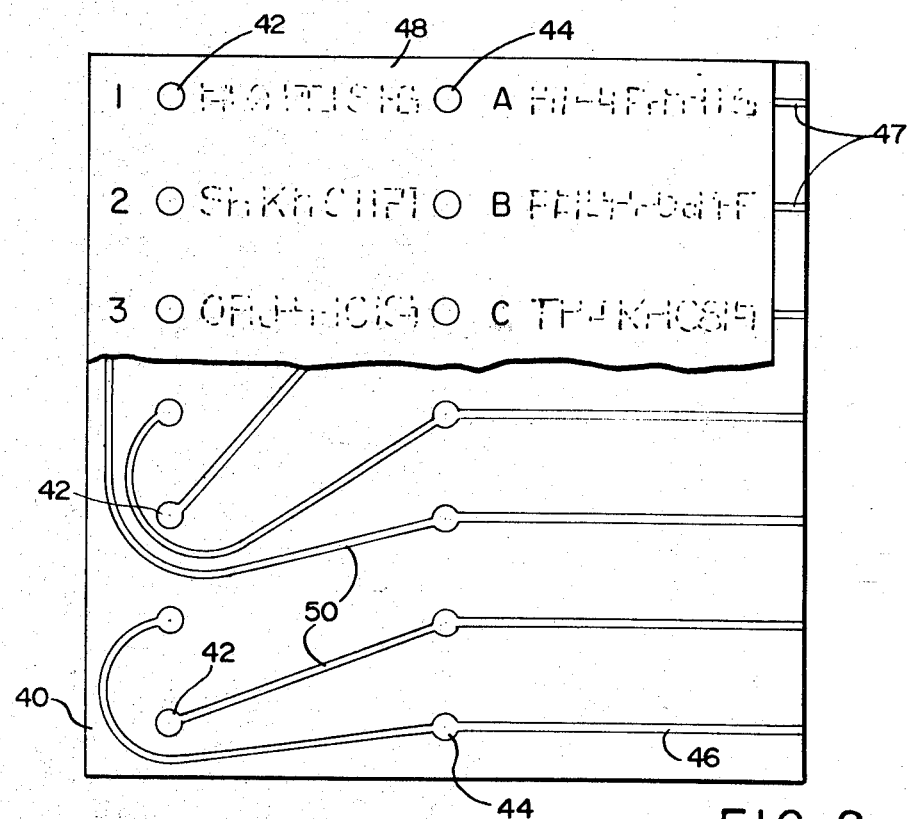
FIG. 2 is a pictorial view of a question and answer card employed in the present invention.

The question and answer cards can be formed by well-known circuit techniques, such as by etching, stamping or silk-screening, a typical format being illustrated in FIG. 2. A circuit board 40 of suitable insulative material, such as pasteboard or fiber has a plurality of conductive points 42 formed near one edge thereof, each of these points being associated with a question to be printed on an overlayer, as will be further explained hereinafter. A plurality of conductive points 44 are arranged along a line at a central portion of board 40, each point 44 being associated with a possible answer for the question associated with corresponding point 42, and each point 44 being connected via a respective etched path 46 to the right hand edge of the board. The overlayer 48 containing the printed questions and answers covers the conductive paths 50 which interconnect the conductive point 42 of a question with a conductive point 44 of a correct answer. Thus, the player cannot see the coded connection between questions and answers. Overlayer 48 does not, however, cover the right hand edge of the card so that the end portions 47 of conductive paths 46 are exposed for connection to the voltage divider network of FIG. 1 by means of a suitable printed circuit connector. In use, the cards can be slidably inserted with exposed conductive paths 47 in engagement with a suitable connector to render that card operative in the system. When it is desirable to change cards a given card can simply be removed from the connector and another one installed in its place. Thus, a library of question and answer cards can be provided for use with the game. Each card may have printed questions and answers, or blank cards may be provided so that a player may devise his own questions and answers.

Figure 3:
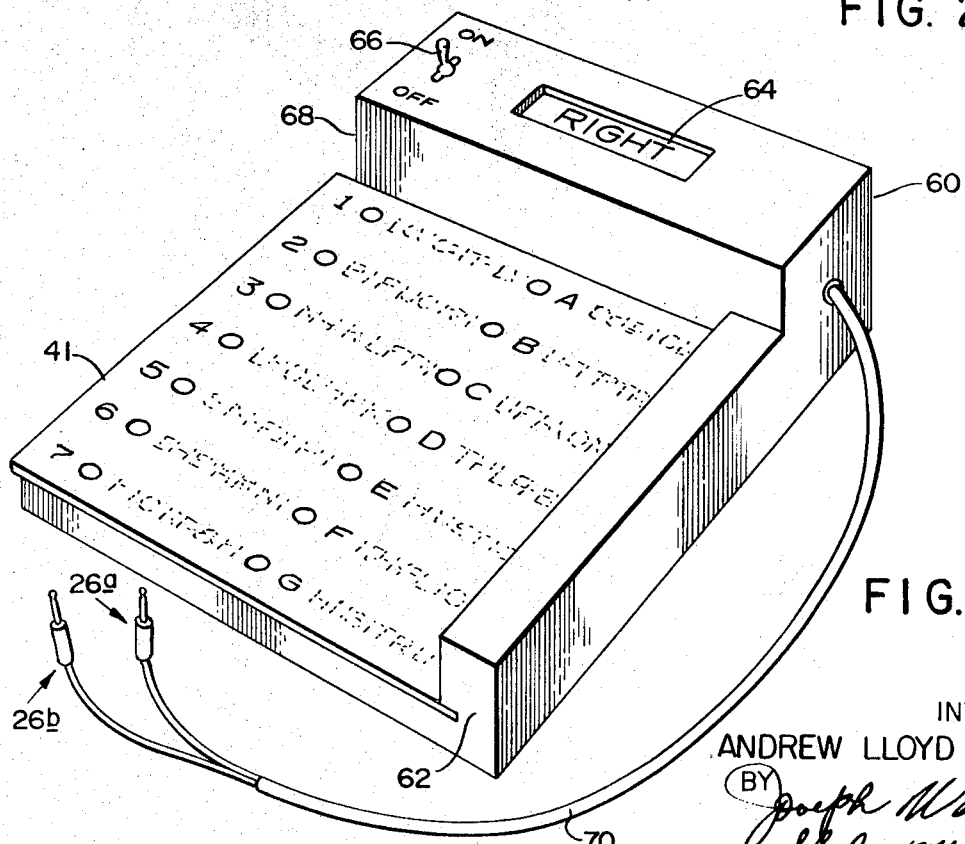
FIG. 3 is a pictorial view of a typical packaging arrangement for the game.

The game can of course be embodied in a variety of forms to suit a particular market, a typical packaging arrangement being illustrated in FIG. 3. The housing 60 is of generally L-shaped configuration with the question and answer card 41 lying on a flat surface and inserted into a connector located within right hand portion 62. The indicator light 64 and an on-off switch 66 are provided on the top surface of pedestal portion 68. The probes 26A and 26B are connected via a suitable cable 70 to the housing 40.

Various modifications and alternate implementations will occur to those versed in the art without departing from the true spirit and scope of the invention. For example, the question and answer cards can be coded and constructed in a variety of ways and variations in the energizing circuitry and in the probes will occur to those versed in the electronic art. In addition, the invention can be arranged to operate from an AC source or from batteries. Accordingly, it is not intended to limit the invention by what has been particularly shown and described, except as indicated in the appended claims.

What is claimed is:

1. A question and answer game comprising:

a coded card having questions and multiple choice answers provided on one surface thereof, a first conductive point associated with each question, a second conductive point associated with each answer, a conductive path not visible from said one surface connecting each first conductive point to a selected one of said second conductive points representing a correct answer to the question associated with said first point;

an indicator operative to denote the selection of a correct answer;

first and second hand-held probes, each having a conductive tip adapted to contact said respective conductve points, and a conductive handle insulated from said tip;

a low voltage circuit connected to said indicator and to the tip of said probes and operative only when said tips are in contact with a first and second conductive point connected by a conductive path to energize said indicator to thereby denote a correct answer; and a high voltage circuit connected to the handles of said probes and operative only when said tips are in contact with a first and second conductive point not connected by a conductive path to provide a shocking potential to said handles to thereby denote an incorrect answer.

2. A question and answer game according to claim 1 wherein said coded card is of electrically insulative material and said conductive paths are formed thereon in planar configuration.

3. A question and answer game according to claim 1 wherein said low voltage circuit includes a source of DC potential having one terminal connected to a conductive tip of said first probe, and the other terminal connected via said indicator to a conductive tip of said second probe; and said high voltage circuit includes a voltage divider connected to said second conductive points and to first and second transistor switches and operative to provide an energizing potential to one of said switches when said tips are in contact with a first and second conductive point not connected by a conductive path; relay means; and a transformer, the secondary of which is connected to the coductive handles of said probes, said high voltage circuit being operative upon energization of either of said transistor switches to apply a chopped DC potential to the primary of said transformer, thereby to cause a higher potential to be applied to said handles.

4. A question and answer game according to claim 1 wherein said high voltage circuit includes:

a source of DC potential;

a vibrating relay;

a transformer having its secondary connected to the conductive handle of said probes and its primary connected to one terminal of said source and to one terminal of said vibrating relay;

a pair of electrical contacts, one connected to the other terminal of said source and the other connected to the other terminal of said vibrating relay; and circuit means for closing said contacts when said tips are in contact with a first and second conductive point not connected by a conductive path.

5. A question and answer game according to claim 4 wherein said circuit means includes:
  relay means operatively associated with said electrical contacts;
  a resistive divider network connected to said second conductive points; and
  first and second transistor switches connected in bipolar configuration and each having its input connected to said resistive divider and its output connected to said relay means; whereby energization of either transistor switch causes closure of said electrical contacts.

6. A question and answer game according to claim 4 wherein said vibrating relay is operative to produce a buzzing noise when energized, thereby to provide a noise indication of an incorrect answer in addition to said shocking potential.

7. A question and answer game according to claim 1 wherein said coded card is removable associated with said game, whereby cards each having different coding can be employed in the game.

8. A question and answer game comprising:
  first and second hand-held probes each having a conductive tip and a conductive handle electrically insulated from said tip;
  a coded card having questions and multiple choice answers provided on one surface thereof, a plurality of conductive points each associated with a respective question and answer, and a hidden conductive path connecting each conductive question point with the conductive point associated with the corresponding corect answer;
  an indicator;
  means for generating a shocking potential;
  circuit means connecting said indicator and the tips of said probes, and connecting said shocking means and the handles of said probes;
  said circuit means being operative only when said tips are in contact with the respective points of a question and a correct answer to energize said indicator, and operative only when said tips are in contact wtih the respective points of a question and a incorrect answer to apply said shocking potential to the handles of said probes.

References Cited

UNITED STATES PATENTS

| | | | |
|---|---|---|---|
| 1,647,276 | 11/1927 | Daman | 35—9X |
| 2,586,710 | 2/1952 | Pick | 35—9 |
| 3,057,082 | 10/1962 | Wellington et al. | 35—9 |

FOREIGN PATENTS

| | | | |
|---|---|---|---|
| 1,051,948 | 9/1953 | France | 35—9 |

WM. H. GRIEB, Primary Examiner